United States Patent [19]

Evans et al.

[11] Patent Number: 4,479,736
[45] Date of Patent: Oct. 30, 1984

[54] REPLACEABLE HANDLE ASSEMBLY

[75] Inventors: Frank C. Evans, Rockford; Merritt J. Nelson, Sparta, both of Mich.

[73] Assignee: Zin-Plas Corporation, Grand Rapids, Mich.

[21] Appl. No.: 560,738

[22] Filed: Dec. 12, 1983

[51] Int. Cl.³ .......................... B25G 3/00; F16D 1/00
[52] U.S. Cl. .................................. 403/287; 403/286; 403/362; 403/24; 74/548; 16/114 R
[58] Field of Search ................. 74/543, 548, 553; 137/315; 251/291, 292; 403/3, 4, 24, 25, 287, 362, 286; 16/114 R

[56] References Cited

U.S. PATENT DOCUMENTS 1,829,365 10/1931 Meyer .................................. 251/292
2,935,896 5/1960 Simon .................................. 74/553

FOREIGN PATENT DOCUMENTS 684098 4/1964 Canada .............................. 251/291

Primary Examiner—Andrew V. Kundrat
Attorney, Agent, or Firm—Varnum, Riddering, Schmidt & Howlett

[57] ABSTRACT

A replaceable handle assembly for coupling a handle to a valve stem comprising a connector for gripping the spline of a valve stem, a base member positioned over the connector and nonrotatably engaging the connector through a rectangular-shaped fitting, and a screw securing the base and connector to a valve stem. A post fits into an upwardly-opening recess in the base through a rectangular fitting and a small set screw secures the post to the base. A handle threads onto the post above the set screw to at least partially conceal the set screw.

20 Claims, 3 Drawing Figures

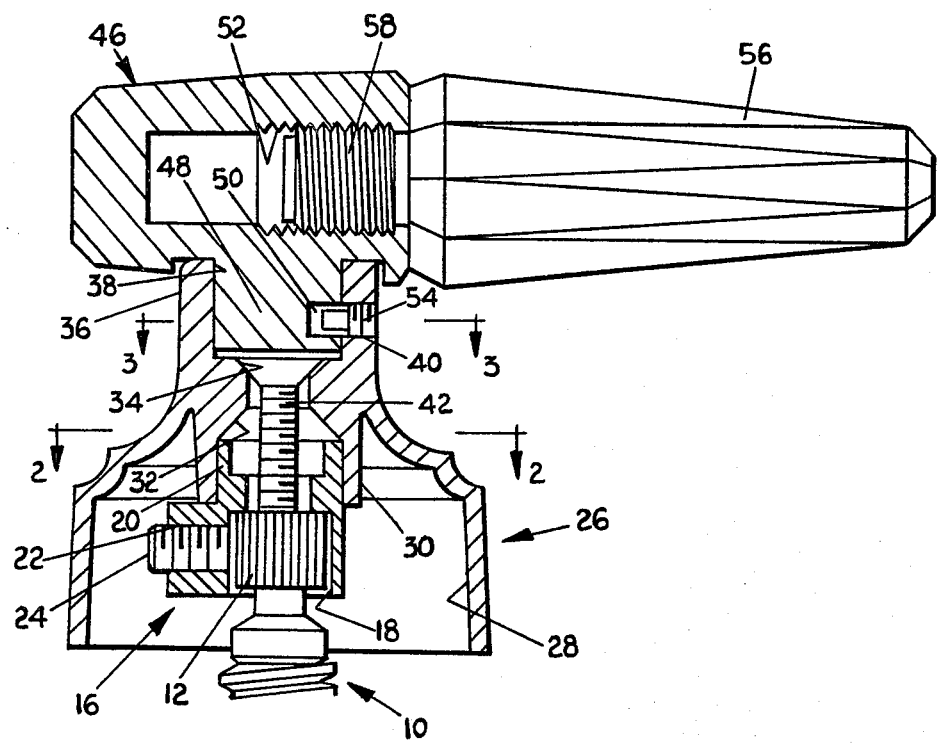
FIG. 1
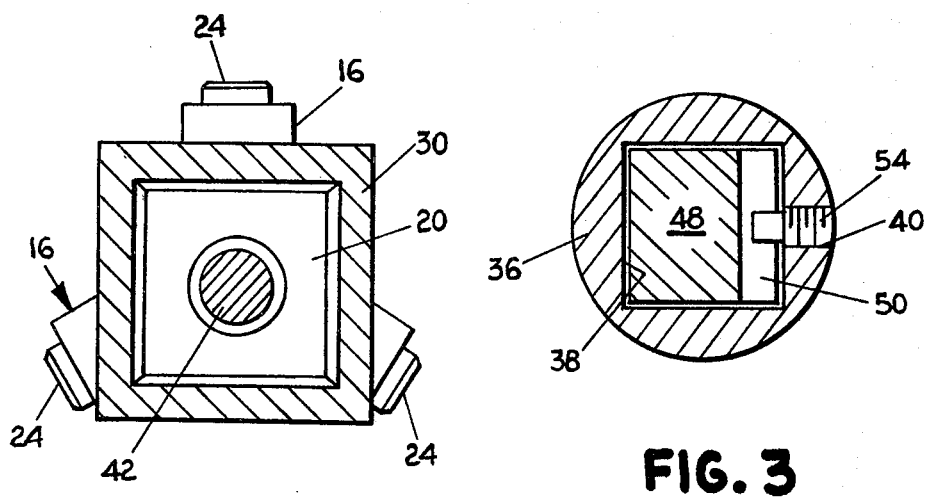
FIG. 2
FIG. 3

REPLACEABLE HANDLE ASSEMBLY

REPLACEABLE HANDLE ASSEMBLY

1. Technical Field

This invention relates to replaceable handle assemblies for plumbing fixtures, and more particularly relates to decorative replaceable handle assemblies wherein the means for securing the handle to the valve stem is substantially concealed.

2. Background Art

Handle assemblies for bathroom fixtures are as varied as the human imagination. However, almost universally these assemblies are designed to fit the exposed spline portion of a valve stem. However, the spacing and size of the spline portions often differ from manufacturer to manufacturer. A tapped hole is provided axially in the spline portion of the valve stem. Typically, knob handles are provided with a corresponding spline portion which mates with the valve stem spline and slides over it. A screw extends through the knob handle and secures the handle to the valve stem. In some cases, the screw is exposed. In more decorative bathroom fixtures, the exposed screw has been considered to be undesirable. In order to avoid this problem, the screw is recessed into the handle and a cap fits over the head of the screw. See, for example, U.S. Pat. No. 4,065,216, issued Dec. 27, 1977.

In the Shuler U.S. Pat. No. 3,791,402, issued Feb. 12, 1974, a replaceable handle assembly has an insert which fits onto the valve stem and is locked in place at three points by set screws. The handle fits onto the insert through a rectangular fitting in a nonrotatable connection between the two parts.

Gresham et al, in U.S. Pat. No. 3,572,162, issued Mar. 23, 1971, disclose a handle assembly comprising an adaptor which has an inner sleeve portion that meshes with a splined valve stem. The inner sleeve portion has an enlarged peripheral wall section connected thereto and spaced radially outwardly therefrom for mating with a downwardly-extending neck of a handle knob. A spring is connected to and extends through the peripheral wall section to engage the handle knob sleeve and retain the same on the adaptor. An aperture is provided in the sleeve for access to the spring for removal of the knob from the adaptor.

DISCLOSURE OF INVENTION

According to the invention, a replaceable handle assembly provides a simple, yet secure, means for nonrotatably securing a handle to a valve stem while concealing the securing means, yet providing ease of installation and removal of the securing means.

The valve assembly according to the invention comprises a connector having means for nonrotatably interlocking a spline of a valve stem and a noncircular base-engaging portion. A base member is positioned on the connector and has a depending skirt to cover the connector and a portion of the stem. A connector-engaging means complementary to the noncircular base-engaging portion of the connector is provided on the base member for nonrotatably coupling the connector to the base member. A noncircular post-engaging means is formed in an upper portion of the base member. Means, such as a screw, are provided for selectively securing the base member to the valve stem to prevent upward movement of the base and the connector with respect to the valve stem. A handle-bearing post having a depending noncircular base-engaging portion is complementarily shaped to nonrotably engage the base member post-engaging means. Means at least partially concealed beneath the handle and carried by the base member are provided for selectively restraining upward movement of the post with respect to the base member.

Preferably, the connector, base-engaging portion and the connector-engaging portion are polygonal, for example rectangular, in cross-section. Further, the connector, base-engaging portion extends upwardly and has a polygonal outer surface, and the base, connector-engaging portion is formed by a depending skirt with a polygonal inner surface. In one embodiment of the invention, the connector has a plurality of set screws for nonrotatably securing the connector to the valve stem.

The means to selectively secure the base member to the valve stem comprises a screw which extends through the base member, through a portion of the connector and is adapted to threadably engage a tapped axial hole in the valve stem.

The noncircular post-engaging means comprises an upwardly-opening cavity formed in an upper portion of said base member and a post, base-engaging portion is received within said cavity. Preferably, the cavity and the post, base-engaging portion are each polygonal in cross-section. In a preferred embodiment of the invention, the depending post, base-engaging portion has a recess in one side wall thereof and the means for selectively restraining upward movement of the post is a screw which extends through a wall in said base in registry with the recess in the one side wall in the post. The recess in the one side wall of said post is preferably a slot.

The handle, in a preferred embodiment, comprises a laterally-projecting blade which is threadably secured to the post through a lateral tapped hole for ease of installation and removal of the screw which selectively restrains upward movement of the post.

BRIEF DESCRIPTION OF THE DRAWINGS

The invention will now be described with reference to the accompanying drawings in which:

FIG. 1 is a side elevational view in section of a handle assembly according to the invention;

FIG. 2 is a view taken along lines 2—2 of FIG. 1; and

FIG. 3 is a view taken along lines 3—3 of FIG. 1.

BEST MODE FOR CARRYING OUT THE INVENTION

Referring now to the drawings, there is shown a valve stem 10 of conventional construction having a spline portion 12 with an axially tapped hole extending from the top thereof.

A polygonal connector 16 of the type disclosed and claimed in the Shuler U.S. Pat. No. 3,791,402 is mounted to the spline portion 12 of the valve stem 10. The connector 16 has a central bore 18 which fits onto the spline portion 12 and an upper rectangular portion 20. Three threaded bores 22 are provided laterally in the bottom portion of the connector 16 and set screws are threadably received in the bores 22 to grip the spline portion 12 of the valve stem 10 and nonrotatably secure the same to the connector.

A base member 26 has a lower cavity 28 with a connector engagement means in the form of an interior depending flange 30 of rectangular cross-sectional shape, forming an interior rectangular cavity 32. A screw bore 34 extends axially through the base in registry with the central bore 28 of the connector 26 and with the axial threaded bore of the valve stem 10. An upper neck portion 36 having an internal rectangular cavity 38 forming a base-engaging portion is formed in the upper portion of the base member 26. A laterally threaded bore extends through the upper neck portion 36.

The base member 26 is mounted on top of the connector 16 with the rectangular cavity 32 of the base 26 complementary to the upper rectangular portion 20 of the connector 16 for nonrotational coupling of the connector to the base member. A screw 42 extends through the screw bore 34 of the base 26, through the central bore 18 of the connector 16 and is threaded into the threaded bore of the valve stem 10. In this manner, the base member 26 is selectively secured to the connector 16 and to the valve stem 10 to prevent upward movement with respect thereto. The connector 16 is nonrotatably mounted to the valve stem 10 by tightening the set screws 24 against the spline portion 12 of the valve stem 10.

A handle bearing post 46 has a depending rectangular portion 48 which is shaped to fit complementarily within the internal rectangular cavity 38 of the base member 26. A lateral slot 50 is formed in a side wall of the rectangular portion 48 in registry with the lateral threaded bore 40 of the base neck portion 36. A threaded bore 52 is provided in an upper portion of the post 46. A set screw 54 is threaded into the lateral threaded bore 40 of the skirt base 26 and extends into the lateral slot 50 to selectively retain upward movement of the post with respect to the skirt base 26.

An elongated handle blade 56 has a threaded end portion 58 which is threadably received in the threaded bore 52 of the post 46 above the set screw 54 to at least partially conceal the same.

The handle assembly is assembled to the valve stem as follows: the polygonal connector 16 is first positioned on the spline portion 12 of the valve stem. The set screws 24 are tightened to secure the polygonal connector 16 to the valve stem 10. The base member 26 is next positioned onto the connector with the rectangular cavity 32 snugly receiving the upper rectangular portion 20 of the polygonal connector 16. The screw 42 is then positioned in the screw bore 34 and is threaded into the axial threaded bore of the valve stem 10, thus securely mounting the skirt base 26 to the polygonal connector 16 and to the valve stem 10. The post 46 is next positioned on the skirt base with the depending rectangular portion 48 snugly received within the internal rectangular cavity 38. The set screw 54 is then threaded into the lateral threaded bore 40 of the skirt base 26 until the inner end thereof projects into the lateral slot 50. Thus, the post 46 is securely mounted to the skirt base 26. The handle 56 is thereafter threaded into the threaded bore 52 of the post 46. The handle assembly can be easily disassembled by following the reverse of the procedure set forth above.

Thus, the invention provides for a secure mounting of a decorative handle assembly to a valve stem. The handle assembly is mounted nonrotatably to the valve stem and the means for securing the handle to the valve stem are essentially concealed. The positioning of the set screw 54 beneath the handle essentially conceals the set screw from view. Yet, the handle mounting is easily assembled and disassembled, if necessary. The set screw can be small because it is not needed for the nonrotational coupling function. The rectangular mountings between the post 46 and the base member 26 assure nonrotatable mounting of a handle with respect to the skirt. The rectangular interface between the base member 26 and the connector 16 provides for secure nonrotatable mounting between these two parts. The use of the three screws in securing the connector to the spline assures nonrotatable mounting of the connector with respect to the valve stem. Thus, the entire handle assembly is rigidly mounted to the valve stem 10.

Whereas the invention has been described with respect to rectangular cross-sectional couplings between the connector 16 and the base member 26, and between the base member 26 and the post 46, these couplings can take any polygonal shape, and even any noncircular shape, so long as the couplings are complementary.

Whereas the invention has been described with reference to a polygonal connector 16 which is secured to a valve stem 10 through set screws 24, it is within the scope of the invention to provide polygonal connectors with an internal configuration which exactly matches the spline portion 12 of the stem 10. The exact fit of the connector with the spline portion will thus grip the spline portion 12 to rotationally lock the connector to the spline portion 12. The connector can otherwise have an upper polygonal configuration to match the rectangular cavity 32 of the base member 26 in the same fashion as the connector 16.

Other variations and modifications are possible within the scope of the foregoing disclosure and drawings without departing from the spirit of the invention which is defined by the appended claims.

The embodiments of the invention in which an exclusive property or privilege is claimed are defined as follows:

1. A replaceable handle assembly for coupling a handle to a valve stem with a spline portion comprising:
   a connector with means for nonrotatably interlocking the spline portion of the valve stem and having a noncircular base-engaging portion;
   a base member positioned on said connector and having a depending skirt to cover said connector and a portion of the valve stem, and connector engagement means complementary to the noncircular base-engaging portion of the connector for nonrotational coupling between said connector and said base member, and noncircular post-engaging means formed in an upper portion of said base member;
   means for selectively securing said base member to said valve stem to prevent upward movement of said base member and connector with respect to said valve stem;
   a handle-bearing post having a depending noncircular base-engaging portion complementarily shaped to nonrotatably engage said base member post-engaging means; and
   means at least partially concealed beneath said handle and carried by said base member for selectively restraining upward movement of said post with respect to said base member;
   whereby said handle is selectively nonrotatably secured to a valve stem through a simple securing means but with said securing means substantially hidden from view.

2. A replaceable handle assembly according to claim 1 wherein said connector base-engaging portion and said base connector-engaging portions are substantial polygonal in cross-section.

3. A replaceable handle assembly according to claim 2 wherein said connector, base-engaging portion extends upwardly and has a polygonal outer surface, and said base, connector-engaging portion is formed by a depending flange with a polygonal inner surface.

4. A replaceable handle assembly according to claim 3 wherein said connector has a plurality of set screws for nonrotatably interlocking said connector to said valve stem.

5. A replaceable handle assembly according to claim 3 wherein said means to selectively secure said base member to said valve stem comprises a screw which extends through said base member, through a portion of said connector and is adapted to threadably engage a tapped axial hole in said valve stem.

6. A replaceable handle assembly according to claim 5 wherein said noncircular post-engaging means comprises an upwardly opening cavity formed in an upper portion of said base member and said post, base-engaging portion is received within said cavity.

7. A replaceable handle assembly according to claim 6 wherein said base member cavity and said post, base-engaging portion are each polygonal in cross-section.

8. A replaceable handle assembly according to claim 7 wherein said post, depending base-engaging portion has a recess in one side wall thereof and said means for selectively restraining upward movement of said post is a screw which extends through a wall in said base in registry with said recess in said one side wall in said post.

9. A replaceable handle assembly according to claim 8 wherein said recess in said one side wall of said post is a slot.

10. A replaceable handle assembly according to claim 8 wherein said handle comprises a laterally-projecting blade which is threadably secured to said post for ease of installation and removal of said screw.

11. A replaceable handle assembly according to claim 6 wherein said handle comprises a laterally-projecting blade which is threadably secured to said post for ease of installation and removal of said means for selectively restraining upward movement of said post.

12. A replaceable handle assembly according to claim 6 wherein said post, depending base-engaging portion has a recess in one side wall thereof and said means for selectively restraining upward movement of said post is a screw which extends through a wall in said base in registry with said recess in said one side wall in said post.

13. A replaceable handle assembly according to claim 12 wherein said recess in said one side wall of said post is a slot.

14. A replaceable handle assembly according to claim 13 wherein said handle comprises a laterally-projecting blade which is threadably secured to said post for ease of installation and removal of said screw.

15. A replaceable handle assembly according to claim 3 wherein said noncircular post-engaging means comprises an upwardly-opening cavity formed in an upper portion of said base member and said post, base-engaging portion is received within said cavity.

16. A replaceable handle assembly according to claim 15 wherein said cavity and said post, base-engaging portion are each polygonal in cross-section.

17. A replaceable handle assembly according to claim 16 wherein said post, depending base-engaging portion has a recess in one side wall thereof and said means for selectively restraining upward movement of said post is a screw which extends through a wall in said base in registry with said recess in said one side wall of said post.

18. A replaceable handle assembly according to claim 1 wherein said noncircular post-engaging means comprises an upwardly-opening cavity formed in an upper portion of said base member and said post, base-engaging portion is received within said cavity.

19. A replaceable handle assembly according to claim 18 wherein said post, depending base-engaging portion has a recess in one side wall thereof and said means for selectively restraining upward movement of said post is a screw which extends through a wall in said base in registry with said recess in said one side wall in said post.

20. A replaceable handle assembly according to claim 1 wherein said handle comprises a laterally-projecting blade which is threadably secured to said post for ease of installation and removal of said means for selectively restraining upward movement of said post.

* * * * *